Figure 1:
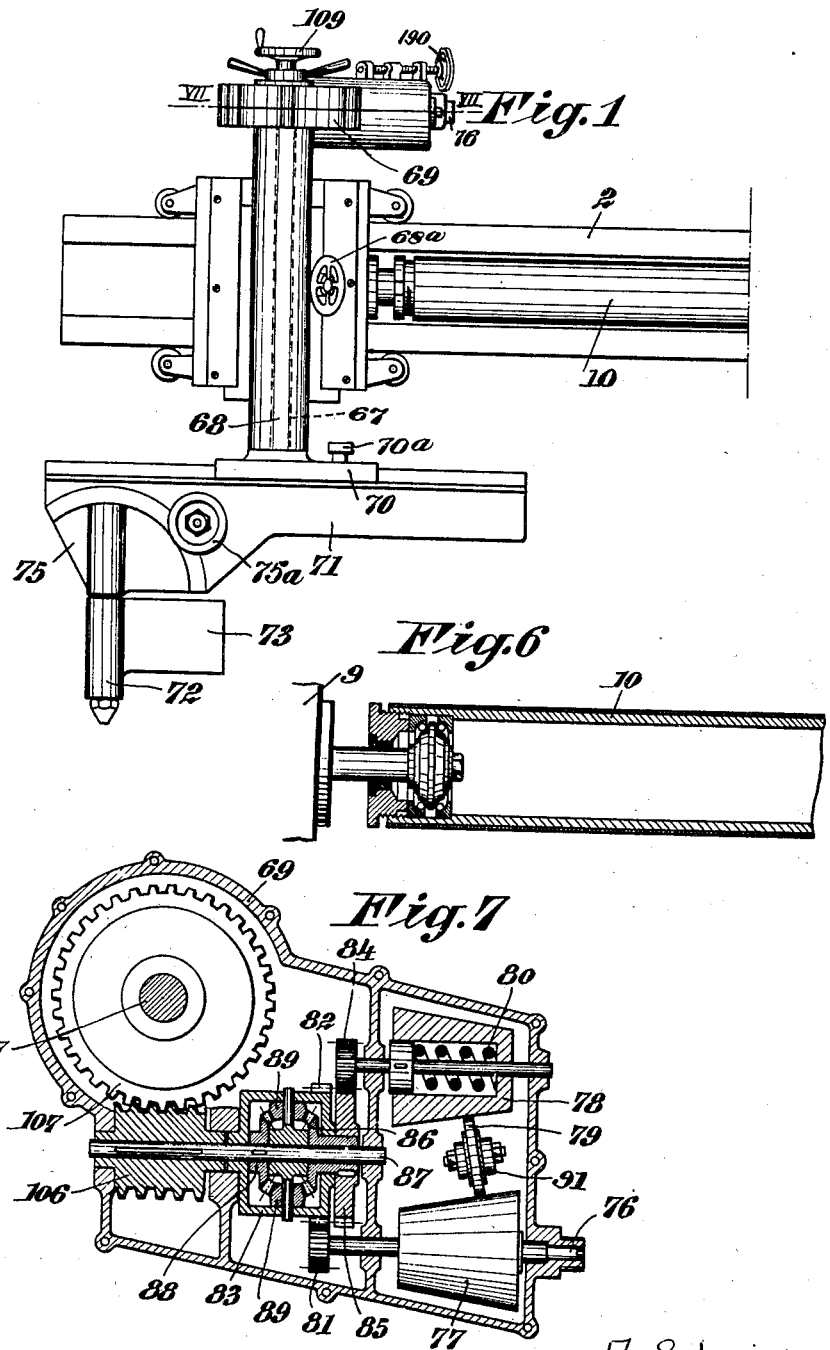

Aug. 8, 1933.  A. SCHMIDT  1,921,887
DEVICE FOR GUIDING IMPLEMENTS, PARTICULARLY THE BURNER
OF CUTTING BURNER OR WELDING MACHINES
Filed April 26, 1932  4 Sheets-Sheet 1

Aug. 8, 1933. A. SCHMIDT 1,921,887
DEVICE FOR GUIDING IMPLEMENTS, PARTICULARLY THE BURNER
OF CUTTING BURNER OR WELDING MACHINES
Filed April 26, 1932 4 Sheets-Sheet 3

Aug. 8, 1933.  A. SCHMIDT  1,921,887
DEVICE FOR GUIDING IMPLEMENTS, PARTICULARLY THE BURNER
OF CUTTING BURNER OR WELDING MACHINES
Filed April 26, 1932  4 Sheets-Sheet 4

A. Schmidt
INVENTOR

By: Marks & Clerk
Attys.

Patented Aug. 8, 1933

1,921,887

UNITED STATES PATENT OFFICE 1,921,887

DEVICE FOR GUIDING IMPLEMENTS, PARTICULARLY THE BURNER OF CUTTING BURNER OR WELDING MACHINES

Adam Schmidt, Vienna, Austria, assignor to Alfred Vogel, Vienna, Austria

Application April 26, 1932, Serial No. 607,635 and in Austria August 22, 1930

15 Claims. (Cl. 266—23)

I have filed application in Austria on Aug. 22, 1930.

This invention relates to a device for guiding implements particularly the burner of cutting burner or welding machines along a predetermined line or design by means of a steerable operating wheel rolling on a surface. In these known machines the burner is guided either positively on a template or by an operating wheel moved by hand on a surface or a drawing. The arrangement is limited to small workpieces if the operating wheel is guided on a table, because it is impossible to guide with sufficient precision the operating wheel on a table of larger size. For mechanical burner cutting, the most important requirement is the absolutely constant cutting speed and the possibility of cutting any figure, even those with arbitrarily curved boundary lines, along an outline marked. These known machines, which are bracket machines, must accomplish every movement by the aid of the longitudinal and transverse feeds or the resultant thereof. The resultant movement, however, undergoes in them a change of velocity, which is a hindrance to cutting along an outline. Furthermore the changes of direction, which are in themselves the most difficult parts of the work, have hitherto been effected by shifting or reversing the movement members. It is therefore only by the most careful attention and skill that the cutting speed can be maintained at such places, with correctness of mechanical operation.

A further disadvantage of certain known machines consists in the fact that the cutting of circular sections with mechanical feed is only possible to a limited extent, since these machines have too little clearance in the cutting speed, and therefore need a calculating table for circular cutting.

The mentioned machines for guiding cutting or welding burners, electrodes and the like hitherto known entirely lack for these reasons the very requirements presumed for a satisfactory and generally applicable cutting or welding machine, since they do not ensure either a smooth and uniform guidance, free from vibrations, of the implement, or by the transition from the working of single articles to series production, call for a reconstruction of the machine.

According to the present invention the above drawbacks are eliminated by the provision of a device for guiding a tool, whereby the longitudinal movement and transverse movement or the combined movement of the tool—or implement carrier is effected by rolling a driving wheel upon the peripheral surface of a tube or cylindric member which is free to move in the axial as well as radial directions and the axial displacement of which is transmitted directly to the implement, and its rotary movement is employed for driving the carriage movable in the longitudinal direction. A further disadvantage of the known machines consists in that the driving wheel moves about on a table and continuously changes its position within the system. According to the present invention the driving wheel is mounted in the carriage which is driven directly like the transverse carriage.

The system of the known devices for guiding the implements, particularly of cutting or welding burners is therefore replaced by a new driving system, which renders it possible to guide the burner or an electrode in any desired direction of movement with the cutting speed always remaining constant, without the necessity of regulating the cutting speed during the cutting.

Compared with the known devices of this kind, this driving system also has the special advantage that the driving wheel operating the carriage can easily be guided on the peripheral surface of the tube by means of a hand lever relieved of pressure or by a hand wheel provided with a pointer. This lever or this wheel are set parallel with respect to straight cutting lines and tangentially in the case of curves.

In a further constructional form two driving wheels are so arranged in a rotatable guiding head as to be rockable about an axis perpendicular to their axis of rotation. This arrangement has the advantage that even the small inaccuracies in the guidance of the implement, which arise when a single driving wheel is arranged directly in the vertical axis of oscillation of its rotary head, are completely eliminated.

The invention further extends to the special construction of the apparatus, and to improvements in the implement guide for use with a template or according to a drawing.

The invention is illustrated by way of example in one constructional form in the accompanying drawings.

Figure 2:
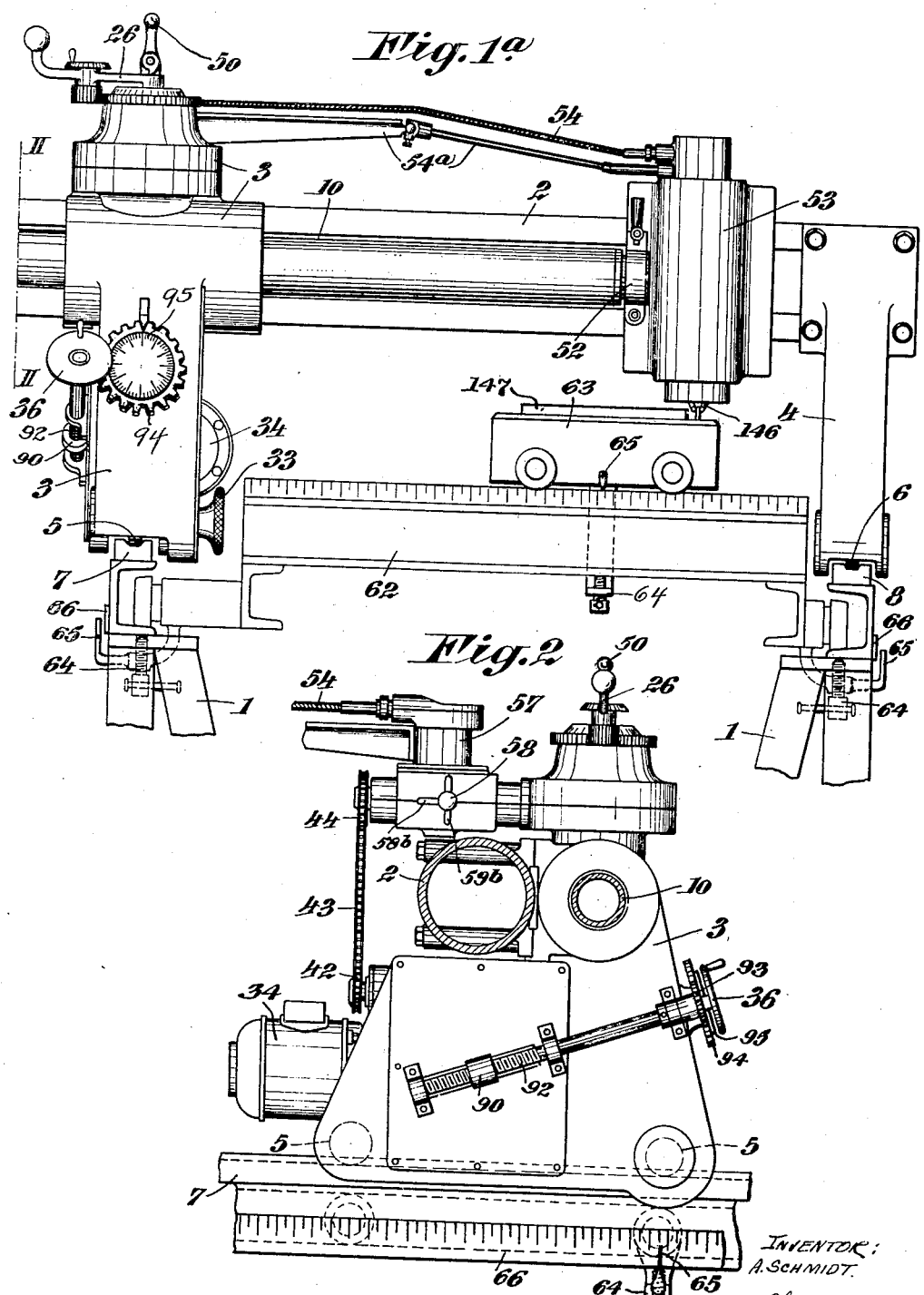
Figure 3:
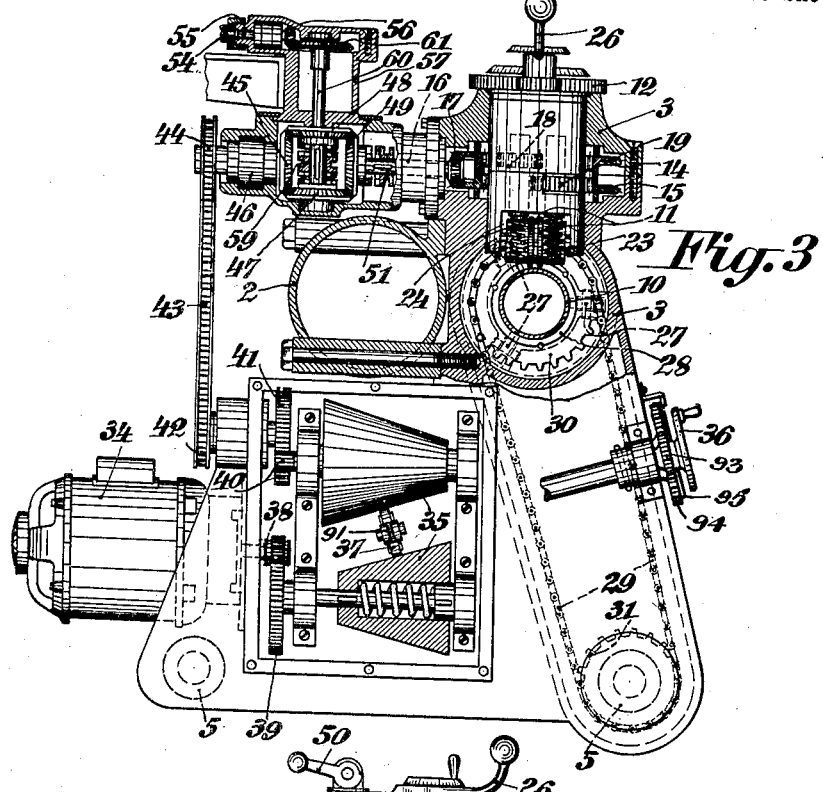
Figure 4:
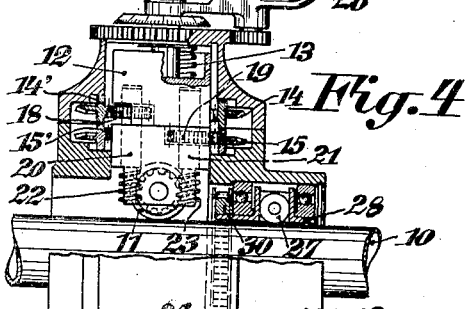
Figure 5:
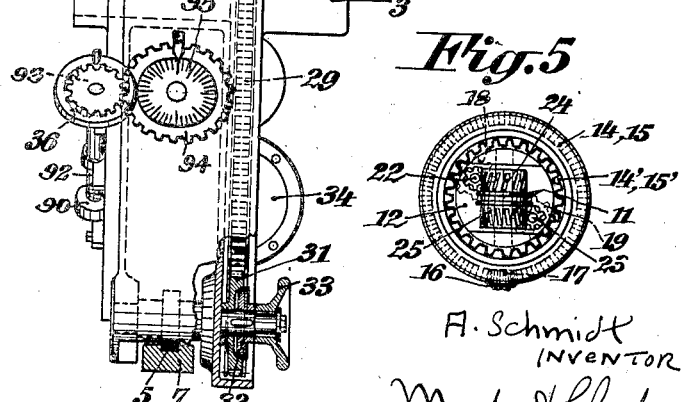

Figures 1 and 1a together provide a view of a machine for guiding implements, more particularly for cutting or welding burners, Figure 2 shows the arrangement of a supporting body of the carriage containing the drive and a controlling mechanism, upon the carrier shown in section on the line II—II in Figure 1a, Figures 3 and 4 show a supporting body of the carriage containing the controlling members, to be actuated by hand, in two sections at right angles to one another, Figure 5 is a view from below of the control head, Figure 6 is a longitudinal section through a cylindrical member with the connecting member of the implement holder, Figure 7 shows the gear for circular cutting, this being an enlarged view taken near the plane of line 7—7 of Fig. 1.

Figure 8:
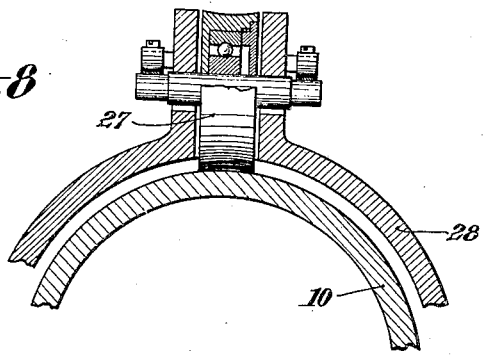
Figure 9:
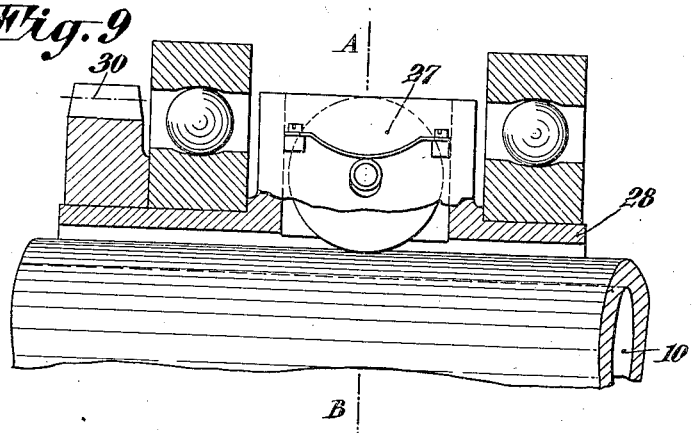
Figure 10:
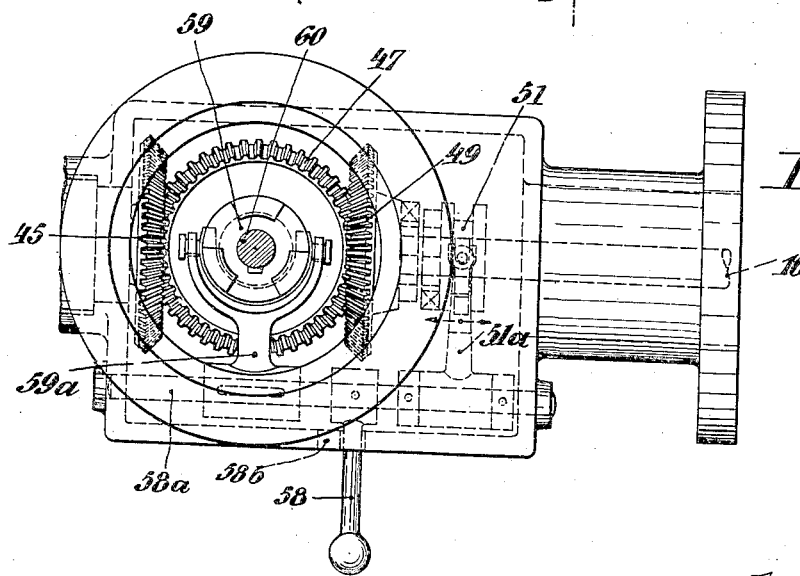

Figures 8 and 9 show the friction clutch constituting the bearing for the cylindric member or tube, Figure 10 is a view of the reversing members of the reversing gear with the rotary head removed and the bevel wheel shown in plan view.

In the constructional example illustrated in Figures 1 to 7 a girder 2 is movably mounted upon a standard 1. The girder 2 is for this purpose equipped with two bearing bodies 3 and 4, in each of which is supported a pair of running rollers 5 and 6, which run upon rails 7 and 8 on the standard 1, and render possible an easy and almost frictionless transverse movement of the girder. Upon the part of the girder 2 projecting beyond the bearing body 3 the implement holder 9 is displaceably supported, preferably by means of rollers. For the displacement of the implement holder 9 on the girder 2 there is rotatably mounted on the former, in the manner illustrated in Figure 6, a cylindrical tube 10, which is rotatably and slidably supported in the supporting body 3. This tube 10 is set in rotation by one or more driving wheels 11, which are supported in a control head 12, rotatable and slidable in the bearing casing, and having its axis of rotation perpendicular to the axis of the tube. The control head 12, rotatable in the supporting body 3, is subject to the action of a strong spring 13, which bears against the cover of the casing, and, by the pressing of the control head, maintains the requisite application pressure for the driving wheels 11 that drive the tube 10. For disconnecting the control head and the driving wheels, there is rockably mounted upon the control head an eccentric lever 50, which bears against the casing cover or the like, and, when actuated, lifts the driving wheels, together with the control head, off the tube 10, against the action of the spring 13.

The driving of the driving wheels 11 is effected through the medium of a gear train arranged partly in the control head 12 and partly outside the latter. This gear train includes two rings respectively having bevel teeth 14, 15, rotatably supported in the bearing body 3 and surrounding the control head, these rings being driven in opposite directions by a bevel wheel 17, connected with the drive of the machine, and mounted upon a shaft 16 journalled in bearings carried indirectly by the supporting body 3. Each of the two rings of bevel teeth 14 and 15 is also provided with a ring of internal teeth, 14' and 15', each of which drives a spur wheel, 18 and 19 respectively, supported in the control head 12. The spur wheels 18 and 19 are mounted upon shafts 20 and 21, which are rotatably supported in the control head 12 parallel to its axis of rotation, and are arranged diametrically opposite to one another. The lower ends of the shafts 20 and 21 are provided with worms 22 and 23, which mesh with worm wheels 24 and 25 on the two driving wheels 11 on opposite sides, so that the opposite rotary movements produced by the two rings of bevel teeth 14 and 15 is converted by the staggered worm wheels 22 and 23 into a unidirectional rotary movement of the driving wheels 11.

By this arrangement according to the invention of the drive for the driving wheels 11 the technical effect is obtained that the transmission torques and also the peripheral speeds of the two driving wheels 11, even in the case of unequal or of only one-sided loading, remain completely equal owing to the opposite rotation of the two sets of driving wheels, so that the freely rotatable control head, and also the driving wheels 11 journalled therein, can never be arbitrarily altered by the drive, in the event of unequal loading into a direction other than that adjusted by hand. From this there arises the further advantage that a device for fixing the control head in its various positions is quite unnecessary, and the man operating the machine can easily make the unloaded control head 12, without any expenditure of force, follow any desired cutting curve by means of a hand lever 26 or handwheel adjustable along a scale. A pinion supported on the hand lever 26 and meshing with a ring of teeth secured to the cover of the bearing body, with a hand wheel, enables the adjustment to be accurately effected by the feel. The arrangement of the hand lever 26 in the axis of the control head furthermore facilitates quite considerably the adjusting of the driving wheels 11 to the requisite cutting direction for the tool, since the hand lever 26 need only be kept at the same angle as the line previously drawn on the work, in order to maintain the correct cutting direction for the implement.

The shifting of the driving wheels 11 round the vertical axis of their control head 12 governs the different kind of movement of the tube 10, and therefore of the implement holder 9.

If the driving wheels 11, in the position illustrated in Figure 4 for example, are directed parallel to the axis of the tube 10, they move the latter, and therefore the implement holder 9, along the girder 2. If the driving wheels 11 are rotated, by rotating their control head 12, by means of the lever 26, through 90°, they set the tube in rotary motion, this motion being transmitted to a gear to be hereinafter described, which drives the running rollers 5 of the supporting body 3, and thereby effects a transverse displacement of the girder 2, together with the implement holder 9 arranged thereon. The implement holder can be moved in the opposite direction by merely reversing the control head 12 through 180°.

Upon adjusting the driving wheels 11 into any desired intermediate position, a resultant movement parallel to the direction of the hand lever 26 is obtained, wherein the implement holder 9, by simultaneous sliding and rotation of the tube 10, is moved in the direction indicated by the lever 26.

The gear necessary for the transverse displacement of the girder 3 by means of the driving wheels 11 consists of a plurality of rollers 27 (Figs. 8 and 9), which are parallel to the axis of the tube 10 and are uniformly distributed over the periphery of the tube, and which directly form the bearing for the tube 10, and are fitted into a carrying ring 28, rotatable in the supporting body 3, and prevented from sliding axially.

These rollers, which support the tube 10 centrally, are subject to the action of springs, which ensure the application pressure required, for the purpose of ensuring the driving thereof even in the event of wear. These rollers 27 only roll upon the tube 10 during axial displacement of the latter, while during rotation of the tube 10 they do not execute any rotation of their own about their ball bearing axes, but, in consequence of their convex bearing surfaces their edges are attached to the tube 10, and are rotated by the latter in the same direction and with the same speed, together with their bearing ring 28, about the axis of the tube. The rotation of the bearing ring 28 is transmitted by means including two chain wheels 30, 31 or the like, connected with one another by a chain 29, to one of the two running rollers 5 of the bearing body 3, so that the carriage formed by the girder 2, with the implement carrier 9, is moved in the correct ratio to the particular cutting speed required for the implement.

For the engagement and disengagement of the automatic transverse transport of the girder 2 and of the work holder 9, the running roller 5 of the supporting body 3 is releasably connected by a clutch 32 with the chain wheel 31 that drives it. The releasable connection consists in this constructional example of a manually actuated jam nut 33 in the shape of a handwheel.

The ball bearings 27 supported in the carrying ring 28 engage the peripheral surface of the tube or cylindric member 10 with an increased frictional contact so that a satisfactory driving of the rollers 27 is ensured even in the case of the minimum rotation of the tube.

In order to enable the speed of the driving wheels to be adjusted to the particular cutting speed required, a continuously variable change-speed gear is according to the invention interposed between the driving motor 34 arranged on the bearing body 3 of the carriage and the driving shaft 16 of the gear for the driving wheels 11, this change-speed gear being adjustable by hand to any desired transmission ratio.

This continuously variable change-speed gear consists of two oppositely directed cones 35 supported side by side, which are subject to axial spring pressure and between which is interposed a transmission wheel 37 longitudinally displaceable by means of an adjusting device including a hand wheel 36. This adjusting device consists of a nut 90, which can be shifted in a straight line by means of a spindle drive, and which is attached by means of a fork 91 to the transmission wheel 37, and adjusts the latter directly to the thickness of material to be cut, according to the adjustment of a hand wheel 36 secured upon the spindle 92, in relation to a graduated disc 95 connected with it by toothed wheels 93 and 94. The motor 34 drives one of the two cones 35 directly through toothed wheels 38 and 39. This cone, according to the position of the transmission wheel 37, drives the second cone 35 at the desired speed, and the latter transmits the motion imparted to it to a chain wheel 42 by means of toothed wheels 40 and 41. The chain wheel 42 is connected by a chain 43 with a second chain wheel 44, which is secured along with a bevel wheel 45 upon a shaft 46. Between the shaft 46 and the driving shaft 16 of the bevel wheel 17 is fitted a reversing gear, the bevel wheels 47 and 48 of which drive the shaft 16 by means of a bevel wheel 49. For the disengagement of the gear for the driving wheels 11 at will, the shaft 16 is connected by a clutch 51, with a bevel wheel 49 running loosely upon it. The clutch 51 is shifted in the axial direction by a fork 51a, secured to a rotatable shaft 58a, which is slidable in the casing parallel to the shaft 16, said fork being operated by a control lever 58, working in a slot 58b of the casing and fixed to the shaft 58a.

In this manner the driving wheels 11 can be adjusted to the particular speed required for driving the tube that guides the implement holder, and can be guided or rocked quite independently thereof by means of the hand lever 26 rotating the control head, in the direction corresponding to the line previously drawn.

If workpieces are to be cut out according to templates, the two driving wheels 11 are first lifted off the tube 10 by actuating the eccentric lever 50 and the drive thereby disconnected. The tube 10 connected with the implement holder 9 is then secured by means of a clip 52 (inserted in its neck 10') upon a guiding head 53, which is longitudinally slidable upon rollers on the girder 2, and is guided by means of two arms 146 provided with rollers on a template 147 fitted to the machine frame. The driving members, which are in themselves know, of the guiding head 53, are connected in a manner known in itself by means of a flexible shaft 54 with the shaft 55 of a bevel wheel 56, which is journalled in a rotary head 57 of the bearing body 3. The driving of the flexible shaft 54 (which in known manner is protected by a link 54a against entanglement) and of the guiding head 53 connected with it is effected from the bevel wheels 47 and 48 of the reversing gear. For this purpose the bevel wheels 47 and 48 can be alternatively coupled by a clutch 59, which is shifted by means of lever 58 that simultaneously actuates the clutch 51, in such a way that it is completely disengaged when the clutch 51 is closed, and meshes with one of the two bevel wheels 47, 48, when the clutch 51 is open. For this object a second fork 59a, engaging the clutch 59, is secured to the shaft 58a. When axially shifting the latter, the fork 59a is out of engagement, while when turning the lever 58 in the vertical slot 59b of the casing, the clutch 59 engages one of the clutch-members of the two toothed wheels 47, 48 and connects the shaft 60 with the driving wheel 45 either for clockwise or anticlockwise rotation.

In this manner the bevel wheels 47 and 48 can be selectively coupled with a shaft 60, which is supported in the axis of rotation of the rotary head 57 and which drives the flexible shaft 54 by means of a bevel wheel 61 meshing with the bevel wheel 56. According to the coupling of one or other of the two bevel wheels 47, 48 with the shaft 55, the flexible shaft 54 is driven in one direction or the other, and the guiding head 53 will thereby positively guide the implement holder 9 in one direction of motion or the other according to the template.

For the clamping and adjusting of the template two carriages 62 and 63, transversely slidable in relation to one another, are arranged on the supporting frame 1 underneath the guiding head 53. One carriage 62 serves only as a carrier for the carriage 63, and is displaceable by means of rollers parallel to the running rails 7 and 8 of the girder 2 on the standard 1. The carriage 63, which carries the template 147, is so supported upon the carriage 62 by means of rollers as to be displaceable transversely to the carriage. Both carriages are provided with clamping members 64, with which they can be fixed in any particular adjusted position.

This device has the special advantage that the template can be adjusted and fixed in relation to the workpiece to be treated, by displacing the two carriages without any trouble, which is of some value, particularly when cutting out a plurality of pieces of one and the same figure. To facilitate the adjusting of the template, pointers 65 with scales 66 are fitted to the carriage 62 and the frame of the device (Fig. 2) for the purpose of executing dividing cuts. The implement holder consists of the actual carrying member 9 longitudinally displaceable on the girder 2 by means of rollers, and of a bearing sleeve 68, vertically displaceable by a handwheel 68a and connected with said sleeve, which receives the implement spindle 67. To the upper end of the bearing sleeve 68 is fitted the casing 69 for an equalizing gear, which drives the implement spindle 67. At the lower end the implement spindle 67 carriers, in a clamping piece 70 arranged perpendicularly to its axis, an angle 71, adapted to be fixed by a lever 70a and to which the implement, in this case the cutting or welding burner 72, with the valve casing 73 for the three fuel pipes 74, is adjustably fitted by means of a sector 75 supported in an arcuate guide and secured by a screw 75a or the like. The implement is rotatably and exchangeably inserted in the sector 75. The welding burner can be adjusted for round cutting by direct attachment of the flexible shaft 54, driven by the shaft 55 to the driving shaft 76 of the speed-changing gear shown in Fig. 7 and by means of the lever 58 reversing the direction of rotation of the wheel 44 from the control head gear 14—25 to the round cutting gear 76—89 and 106, 107. In the round cutting of abutting or welding edges, the welding burner is driven by the implement spindle 67 and rotated round the bearing sleeve at the radius adjusted by means of the angle 71. According to the inclination of the cutting or welding burner all circular cuts can be worked out by means of the sector 75 to provide either abutting or welding edge cuts.

The operations of the various kinds of cutting will now be comprehensively described.

Assuming that the machine is to work on normal cutting, the cutting line is marked on the work, and the implement has to be guided by hand.

The driving motor 34 is switched on, and drives the driving shaft 16 of the gear for the driving wheels 11 through the continuously variable change-speed gear 35 adjusted in advance to the cutting speed required. The tool or the cutting burner is then adjusted to the cutting point by longitudinally displacing the implement holder 9 on the girder 2 of the carriage and transversely displacing the girder 2 by hand on to the work to be done.

When the machine is completely ready for operation, by rocking the eccentric lever 50, the control head 12 is set free, and the latter, under the pressure of its spring 13, presses the driving wheels 11 against the tube 10. The driving wheels 11 will immediately drive the tube 10 in the direction given by the position of the adjusting lever 26. By adjusting the adjusting lever 26 into the same direction as the cutting curve drawn in advance, the operator of the machine can without difficulty cut out figures of various shapes, without having to interrupt the cutting operation when the cutting line undergoes a change of direction. For the quick switching off of the drive, the eccentric lever 50 is rocked upwards, and the driving wheels 11 thereby lifted off the tube 10 against the action of the spring 13, which result in an instantaneous interruption of the driving movement.

If, however, figures are to be cut out with the machine according to a template, the latter is secured to the carriage 63, and is adjusted in relation to the work to be treated by displacing the two carriages 62 and 63 (see Fig. 1). The tube 10, uncoupled from the driving wheels 11, is secured by means of the clip 52, placed in its neck 10, to the guiding head 53 slidably supported on the girder 2, this guiding head being engaged with the flange of the template 147 in a known manner by its feeler rollers 147 (Fig. 1). The guiding head 53 is connected by the flexible shaft 54 with the shaft 55 of the reversing gear, and by the latter, after adjustment of the switch lever 58 within the vertical slot, is driven in one direction of rotation or the other. The guiding head then runs round in the path of movement formed by the template 147, and transmits these movements by means of the tube 10 and the girder 2 directly to the implement holder, which guides the implement positively according to the shape of the template. The stopping of the drive for the guiding head 53 is effected either by the switch lever 58 adjusted in the center position (Fig. 2) or by means of a pear switch, not shown, which is within reach from all points, and which is included in the lead of the motor 34. If a number of figures of the same form are to be cut out side by side, it is only necessary to adjust the two carriages 62 and 63 in relation to the work by the aid of the scale divisions 66.

For cutting out round figures the machine is changed over to the round cutting device. For this purpose the implement spindle 67 is provided with the angle bar 71, shown in Figure 1, carrying the sector 75 for oblique adjustment, and the flexible shaft 54 is connected to the driving shaft 76 of the speed changing gear located on the implement holder. After closing the clutch 59 by adjusting the switch lever 58 within the vertical casing—slot 59b, the implement spindle 67 is driven by the equalizing gear at the requisite cutting speed. This equalizing gear for round cutting consists of two cones 77 and 78, rotatably supported side by side and pointing in opposite directions, which are kept in cooperation with one another by a longitudinally slidable transmission wheel 79. For the shifting of the transmission wheel there serves a spindle drive 190 adjustable by hand. For maintaining the cooperation of the two cones there serves a spring 80, which presses one cone 78 and the transmission wheel 79 toward the other cone 77. The cone 77, which is mounted fast upon the driving shaft 76, which is adapted to be coupled to the flexible shaft 54, drives the differential casing 83 by means of the toothed wheels 81 and 82. The cone 78 is connected by its toothed wheel 84 with a toothed wheel 85, which in its turn is connected with the hub of one toothed bevel wheel 86 of the differential gear, which revolves loosely upon the shaft 87 of the second differential toothed wheel 88. Between the two differential toothed wheels 86 and 88 are arranged in a known manner the bevel planet wheels 89, which are supported in the differential casing 83. Upon the shaft 87 is also secured a worm 106, which meshes with a worm wheel 107, which is mounted loose upon the implement spindle 67 and is coupled with the latter by means of a clamping nut 109.

The method of working of this gear train is as follows:—

The driving is effected directly through the shaft 76, one cone 77 and the gear wheels, to the differential casing 83. The differential casing drives by means of the planet wheels 89, on the one hand, with the bevel wheel 88, the worm 106 connected with it, and therefore the implement spindle 67, and, on the other hand, through the second bevel wheel 86, by means of the toothed wheels 84 and 85, the second cone 78.

Thus the cones 77 and 78 are permanently coupled with one another not by the transmission wheel 79 but also by the differential and, according to the setting of said wheel 79, drive the bevel wheel 88 and thus the implement spindle 67 at the desired speed. While in the one extreme adjusted position of the transmission wheel, the bevel wheel 88 of the differential and thus the implement spindle 67 are at a standstill owing to the rapid speed of rotation of the bevel wheel 86, while the bevel wheel 88 drives with the highest speed the implement spindle in the other extreme position of the transmission wheel 79. The combination of this continuous speed-changing gear with a differential renders it possible to adjust the speed of the implement spindle by means of the transmission wheel 79 from zero to a maximum limited by the effect of the motor 34.

It is therefore possible to adjust the cutting speed for circular cuts accurately for any diameter by means of the spindle drive 190 on a suitable scale. By the adjusting of the cutting speed for the round cutting by means of the continuously variable change-speed gear fitted to the implement holder 9, not only is the speed adjusted to the diameter and thickness of material of the workpiece in question on circular cutting, but at the same time the cutting speed of all other kinds of cutting that can be carired out with the machine is determined for the same thickness of material, so that in the case of workpieces of the same thickness, and continuous change of cutting, the work involved in changing over the change-speed gear from one kind of cutting to the other is saved.

I claim:—

1. Device for guiding implements, particularly the burner of cutting burner—or welding machines, comprising in combination a carriage, a cylindric member rotatably and slidably mounted on said carriage, a driving wheel adjustable as to its vertical plane and rolling on said member, an implement holder arranged on said carriage and connected with said member, said holder moving transverse to the direction of movement of the carriage during the movement of said member on the carriage, and means transmitting the rotary movement of said member to said carriage for shifting said holder in the direction of movement of the carriage.

2. Device for guiding implements, particularly the burner of cutting burner—or welding machines, comprising in combination a carriage, a cylindric member rotatably and slidably mounted on said carriage, a driving wheel adjustable as to its vertical plane and rolling on said member, said driving wheel consisting of two co-axially supported wheels driven independently of one another in the same direction of rotation and at the same speed, an implement holder arranged on said carriage and connected with said member, said holder moving transverse to the direction of movement of the carriage during the movement of said member on the carriage, and means transmitting the rotary movement of said member to said carriage for shifting said holder in the direction of movement of the carriage.

3. Device for guiding implements, particularly the burner of cutting burner—or welding machines, comprising in combination a carriage consisting of two bearing bodies and a girder connecting the latter, a cylindric member rotatably and slidably mounted in one of said bearing bodies, a control head arranged in the bearing body of said cylindric member, a driving wheel mounted in said control head and rolling on said member, an implement holder arranged on said carriage and connected with said member, said holder moving transverse to the direction of movement of the carriage during the movement of said member of the carriage, and means transmitting the rotary movement of said member to said carriage for shifting said holder in the direction of movement of the carriage.

4. Device for guiding implements, particularly the burner of cutting burner—or welding machines, comprising in combination a carriage consisting of two bearing bodies and a girder connecting the latter, a cylindric member rotatably and slidably mounted in one of said bearing bodies, a control head arranged in the bearing body of said cylindric member, a driving wheel mounted in said control head and rolling on said member, said driving wheel consisting of two co-axially supported wheels driven independently of one another in the same direction of rotation and at the same speed, two toothed wheels accorded to each of the wheels of said driving wheel, a driving member supported in one of said bearing bodies and rotating said toothed wheels in the opposite directions of rotation, a motor arranged on the carriage and operating the said driving wheel, an implement holder arranged on said carriage and connected with said member, said holder moving transverse to the direction of movement of the carriage during the movement of said member on the carriage, and means transmitting the rotary movement of said member to said carriage for shifting said holder in the direction of movement of the carriage.

5. Device as claimed in claim 3 further comprising a lever secured to the control head parallel to the plane of the driving wheel and set always parallel to the direction of cutting for guiding the implement secured to the implement holder.

6. Device for guiding implements, particularly the burner of cutting burner—or welding machines, comprising in combination a carriage consisting of two bearing bodies and a girder connecting the latter, a cylindric member rotatably and slidably mounted in one of said bearing bodies, a control head slidably mounted in the bearing body of said cylindric member, a driving wheel mounted in said control head and rolling on said member, a spring arranged in the bearing body of said cylindric member and forcing the control head and driving wheel on to said cylindric member, an eccentric lever mounted on the bearing body of the cylindric member and co-operating with said control head lifting away from said cylindric member the control head and driving wheel against the action of said spring, an implement holder arranged on said carriage and connected with said member, said holder moving transverse to the direction of movement of the carriage during the movement of said member on the carriage, and means transmitting the rotary movement of said member to said carriage for shifting said holder in the direction of movement of the carriage.

7. Device for guiding implements, particularly the burner of cutting burner—or welding machines, comprising in combination a carriage consisting of two bearing bodies and a girder connecting the latter, a cylindric member rotatably and slidably mounted in one of said bearing bodies, a friction coupling fitted to the bearing body of said cylindric member and forming the bearing of the latter, a driving wheel rolling on said cylindric member, an implement holder arranged on said carriage and connected with said member, said holder moving transverse to the direction of movement of the carriage during the movement of said member on the carriage, and means transmitting the rotary movement of said member to said carriage for shifting said holder in the direction of movement of the carriage.

8. Device as claimed in claim 7, in which the friction coupling comprises a carrying ring and of rollers mounted in the latter in the direction of the axis of the cylindric member, and a transmission member connecting the running roller of the carriage with said carrying ring.

9. Device as claimed in claim 7 in which the friction coupling consists of a carrying ring and of rollers mounted in the latter in the direction of the axis of the cylindric member, a transmission member connecting the running roller of the carriage with said carrying ring, and a disconnecting member in said transmission member for the interruption of the movement of the carriage.

10. Device as claimed in claim 4 further comprising a speed changing gear connected with the motor and driving said driving member at required cutting speed.

11. Device as claimed in claim 4 further comprising a guiding head for template cuts running on the girder, and means for connecting said head with the cylindric member and the motor.

12. Device as claimed in claim 4 further comprising a guiding head for template cuts running on the girder, means for connecting said head with the cylindric member and the motor, and a reversing gear arranged between the motor, the toothed wheels and the guiding head.

13. Device as claimed in claim 4 further comprising a guiding head for template cuts running on the girder, means for connecting said head with the cylindric member and the motor, and a reversing gear arranged between the motor, the toothed wheels and the guiding head, two clutches fitted into said reversing gear, and an operating lever engaging said clutches.

14. Device as claimed in claim 4 further comprising a spindle arranged in the implement holder, a clamping piece for the implement on said spindle, and means connecting the latter with the motor.

15. Device as claimed in claim 4 further comprising a spindle arranged in the implement holder, a clamping piece for the implement on said spindle, a speed changing gear co-operating with the spindle, and means connecting said gear with the motor.

ADAM SCHMIDT.